(12) United States Patent
Hirschmann et al.

(10) Patent No.: US 6,174,572 B1
(45) Date of Patent: Jan. 16, 2001

(54) NEMATIC LIQUID-CRYSTAL COMPOSITION

(75) Inventors: Harald Hirschmann, Darmstadt; Sven Schüpfer, Aschaffenburg; Marcus Reuter, Darmstadt, all of (DE)

(73) Assignee: Merck Patent Gesellschaft mit beschrankter Haftung (DE)

( * ) Notice: Under 35 U.S.C. 154(b), the term of this patent shall be extended for 0 days.

(21) Appl. No.: 09/126,955

(22) Filed: Jul. 31, 1998

(30) Foreign Application Priority Data

Aug. 1, 1997 (DE) ................................................ 197 33 199

(51) Int. Cl.⁷ ............................ C09K 19/00; C09K 19/30
(52) U.S. Cl. ........................................ 428/1.1; 252/299.63
(58) Field of Search ............................. 252/299.63; 428/1

(56) References Cited

U.S. PATENT DOCUMENTS

| | | | |
|---|---|---|---|
| 5,013,477 | * | 5/1991 | Buchecker et al. ............. 252/299.63 |
| 5,102,578 | * | 4/1992 | Buchecker et al. ............. 252/299.63 |
| 5,380,462 | * | 1/1995 | Kelly et al. ..................... 252/299.63 |
| 5,653,911 | * | 8/1997 | Kondo et al. ..................... 252/299.01 |
| 5,709,820 | * | 1/1998 | Kato et al. ....................... 252/299.61 |
| 5,720,899 | * | 2/1998 | Kondo et al. ..................... 252/299.01 |
| 5,776,367 | * | 7/1998 | Matsui et al. .................... 252/299.63 |

* cited by examiner

*Primary Examiner*—C. H. Kelly
(74) *Attorney, Agent, or Firm*—Millen, White, Zelano, & Branigan, P.C.

(57) ABSTRACT

The invention relates to nematic liquid-crystal compositions comprising bisalkenyl compounds of the formula I

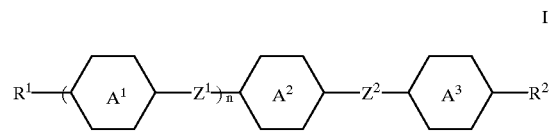

and to their use in plasma-addressed LCDs.

14 Claims, No Drawings

NEMATIC LIQUID-CRYSTAL COMPOSITION

BACKGROUND OF THE INVENTION

The invention relates to nematic liquid-crystal compositions based on bisalkenyl compounds and terminally fluorinated compounds. These compositions are particulary suitable for plasma-addressed display devices.

Plasma-addressed displays (PADs) are of great utility for high-information displays, which are of commercial interest. Such PADs are used in TV applications and in high-information displays for computer screens, automobiles and aircraft.

PADs have electrical switching elements and a plasma cell with a plurality of addressing channels which is connected to the display cell.

Such PADs are disclosed, for example, in WO 96/00925, EP 0 628 944, EP 0 545 569, U.S. Pat. No. 4,896,149 and U.S. Pat. No. 5,077,553.

In a PAD, the switching elements are addressed via a multiplexing scheme. This charges the electrodes of a pixel in the limited time during which they are active. They subsequently become and remain inactive until they are addressed again in the next cycle. Consequently, the voltage change at a plasma-addressed pixel is an unwanted, but very crucial characteristic of such a display. Discharge of the electrodes of the pixel is determined by two factors, the capacity of the pixel and the specific resistance of the liquid-crystal material, i.e., the liquid crystal, between the electrodes.

Conventional liquid-crystalline materials for active matrix displays (AMDs) are unsuitable for PADs since they have excessively high values for the dielectric anisotropy.

There therefore continues to be a great demand for liquid-crystal compositions having high specific resistance and having other material properties which are suitable for use in PADs, such as, for example, a broad nematic mesophase range with an extremely low smectic-nematic transition temperature and the absence of crystallization at low temperature.

A further requirement in such compositions is for high steepness of the characteristic lines (small difference between $V_{90}$ and $V_{10}$)

SUMMARY OF THE INVENTION

An object of the invention is to provide liquid-crystal compositions which have very high specific resistance and which also satisfy the other requirements.

An additional requirement is for compositions having low An values of <0.1 and rotational viscosities of $\leq 150$ mPa·s at 20° C., preferably $\leq 120$ mPa·s, in particular $\leq 100$ mPa·s.

It has now been found that nematic liquid- crystal compositions for plasma addressed liquid crystal displays (PALCDs) comprising at least one compound of the formula I

in which

R$^1$ and R$^2$, independently of one another, are alkenyl or alkenyloxy having 1 to 8 carbon atoms, each $Z^1$ and $Z^2$, independently of one another, and if $Z^1$ is present a number of times, these radicals also independently of one another, are a single bond, —(CH$_2$)$_2$—  —COO—, —OCO—, trans—CH=CH—, —CH$_2$O— or —OCH$_2$—, where $z^2$ is preferably a single bond, each A$^1$, A$^2$ and A$^3$, independently of one another, and if A$^1$ is present a number of times, these radicals also independently of one another, are trans-1,4-cyclohexylene, 1,4-cyclohexenylene, in which also one or two nonadjacent CH$_2$ groups may be replaced by oxygen, 1,4-phenylene, 2-fluoro-1,4-phenylene, 3-fluoro-1,4-phenylene, 2,3-difluoro-1,4-phenylene, 3,5-difluoro-1,4-phenylene, 2,6-difluoro-1,4-phenylene or 1,5-pyridyl or 1,5-pyrimidyl, in which one or two H atoms are optionally replaced by F, where at least one of the rings A$^2$ is preferably a trans-1,4-cyclohexylene rings, and particularly preferably both rings A$^2$ and A$^3$ are trans-1,4-cyclohexylene, and n is 0, 1 or 2, are particularly suitable for PAD applications. $Z^2$ is preferably a single bond, and at least one of the rings A$^2$ and A$^3$ is preferably a trans-1,4-cyclohexylene ring. Particularly preferably, both rings A$^2$ and A$^3$ are trans-1,4-cyclohexylene. In PADs, very high values for the RC time (i.e., the time constant for the discharge of the pixel electrodes) can be achieved. These compositions likewise have reduced viscosity and enable AMDs to be operated at the first transmission minium, and exhibit no crystallization and no occurrence of smectic phases when stored in test cells of appropriate cell gap for times of at least 100 hours preferably 500 hours and most preferably 1000 hours at a temperature of −20° C., preferably at −30° C. and most preferably of −40° C.

Preference is furthermore given to liquid-crystal mixtures which comprise at least one compound of the formula II

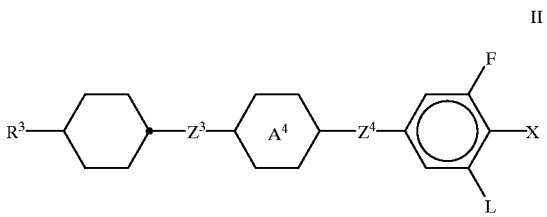

in which

R$^3$ is alkyl, alkenyl, alkyloxy or alkenyloxy having 1–8 carbon atoms, $Z^3$ and $Z^4$, independently of one another, are a single bond, (CH$_2$)$_2$, OCH$_2$, CH$_2$O COO, CN, F, CF$_2$H or CF$_3$ X is OCF$_2$H, OCF$_3$, OCH$_2$CF$_3$, OCHFCF$_3$, OCF$_2$CF$_2$H or F L is H or F and A$^4$ is trans-1,4-cyclohexylene, 1,4-phenylene, 3-fluoro-1, 4-phenylene or 3,5-difluoro-1,4-phenylene.

Particular preference is given to nematic liquid- crystal compositions which comprise at least one compound of the formula Ia

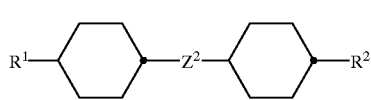

Ia in which $R^1$ and $R^2$, independently of one another, are alkenyl or alkenyloxy having 1 to 8 carbon atoms, and $Z^2$ is a single bond, —(CH$_2$)$_2$— or trans—CH=CH—.

$Z^2$ is particularly preferably a single bond.

Nematic liquid-crystal compositions of the present invention furthermore preferably comprise at least one compound of the formula III

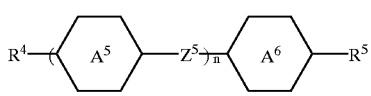

III in which $R^4$ and $R^5$, independently of one another, are alkyl, alkoxy, alkenyl or alkenyloxy having 1 to 10 carbon atoms, in which 1 or a maximum of 2 non-adjacent CH$_2$ groups may be replaced by 0, each $Z^5$ if it is present a number of times independently of one another, is a single bond, COO, OCO, (CH$_2$)$_2$, OCH$_2$, CH$_2$O or trans—CH=CH, each $A^5$ and $A^6$ independently of one another, and if $A^5$ is present a number of times these radicals also independently of one another, are trans-1,4-cyclohexylene, 1,4-cyclohexenylene, in which also one or two nonadjacent CH$_2$ groups may be replaced by oxygen, 1,4-phenylene, 2-fluoro-1,4-phenylene, 3-fluoro-1,4-phenylene, 2,3-difluoro-1,4-phenylene, 3,5-difluoro-1,4-phenylene, 2,6-difluoro-1,4-phenylene or 1,5-pyrimidinediyl, in which one or two H atoms are optionally replaced by F, and n is 1, 2 or 3.

Very particular preference is given to nematic liquid-crystal compositions which comprise at least one compound of the formula Iaa

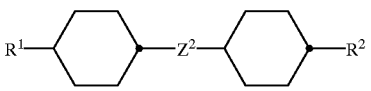

Iaa in which $R^1$ and $R^2$, are each, independently of one another, CH=CH$_2$, CH=CH-CH$_2$—CH, and/or CH=CH—CH$_3$ and $Z^2$ is (CH$_2$)$_2$ or a single bond.

$Z^2$ is preferably a single bond and $R^1$ and $R^2$ are preferably identical to each other.

Preference is furthermore given to nematic liquid-crystal compositions which, besides compounds of the formula Iaa, comprise at least one further compound of the formula I

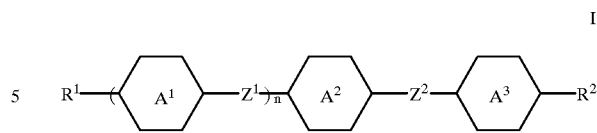

I and/or of the formula II

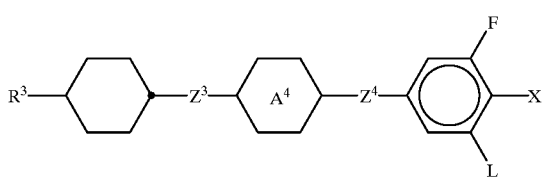

II

In a preferred embodiment, the compositions according to the invention comprise from 10 to 34% of two or more compounds of the formula I.

The nematic compositions particularly preferably comprise at least two compounds of the formula Iaa from the group consisting of the formulae Ia1 to Ia9:

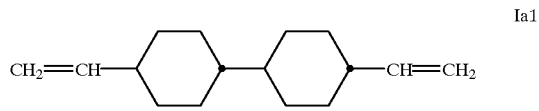

Ia1

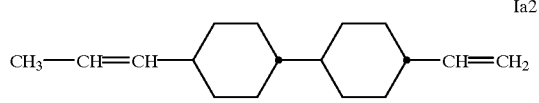

Ia2

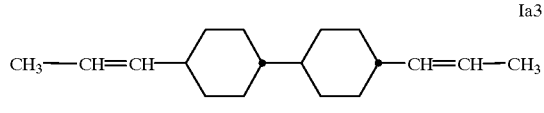

Ia3

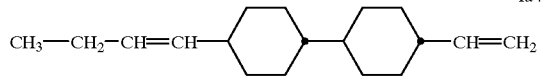

Ia4

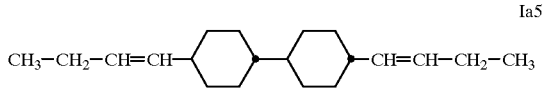

Ia5

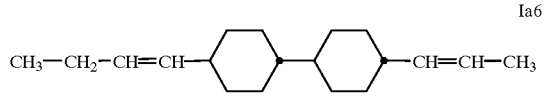

Ia6

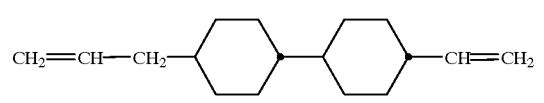

Ia7

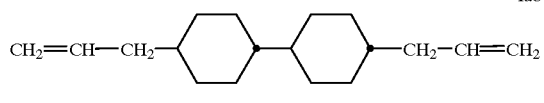

Ia8

Ia9

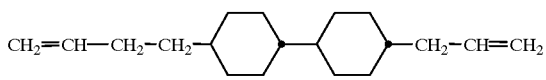

The symmetrically substituted compounds of the formula Iaa, i.e., the compounds Ia1, Ia3, Ia5 and Ia8, are preferred, and of these, very particular preference is given to the 1-alkenyl compounds Ia1, Ia3 and Ia5. The best response times are achieved when using Ia1, Ia2 and Ia3. The most preferred compounds are those of the formulae Ia1 and Ia5.

The LC compositions according to the invention have a dielectric anisotropy, measured at 20° C. and 1 kHz, of less than 4.0, preferably between 1.0 and 3.0, in particular from 1.5 to 2.5. The LC compositions according to the instant invention have a birefringence at 20° C. and 589 nm of not more than 0.1, preferably not more than 0.08, especially preferred of not more than 0.075 and most preferred of below 0.07. The voltage holding ratio HR after 5 minutes at 100° C. and IV using a commercial equipment of Antronic-Melchers, Germany, is at least 98%, preferably higher than 98.5%, especially preferred higher than 99.0% and most preferred at least 99.5%. The clearing point of the compositions according to the invention is above 75° C., in particular above 80° C., very particularly above 90° C.

Compositions of this type preferably comprise two, three or four compounds of the formula I. Preferred compositions comprise at least of more than 10% by weight of the individual compounds of the formula I.

The compounds of the formula I are disclosed in the German patent applications and can be prepared analogously to known compounds.

The compounds of the formulae II and III are known to the person skilled in the art.

Preferred compositions likewise comprise two or more compounds of the formula III. Preference is given here to the compounds selected from the group consisting of the formulae IIIa and IIIb:

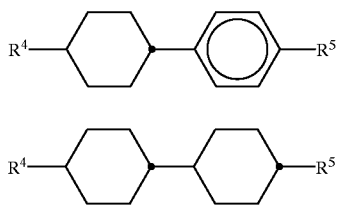

IIIa

IIIb in which $R^4$ and $R^5$ are as defined above under the formula III.

In a preferred embodiment, the compositions according to the invention comprise at least two compounds of the formula IIIa.

The compositions according to the invention preferably comprise from 6 to 48% by weight, in particular from 10 to 34% by weight or from 16 to 30% by weight, of components of the formula I. The percentages by weight for the other groups are preferably in the following ranges:

Formula II: from 10 to 45%, in particular from 18 to 38%
Formula III: from 5 to 52%, in particular from 12 to 40%.

The components of the formulae I, II and II preferably form the basis of the claimed compositions and together make up at least 60% by weight, particularly preferably at least 75% by weight, of the compositions However, it is also possible to use further LC components in smaller percentages in addition to the components of the formulae I to III for fine adjustment of the claimed compositions. In t his case, compounds having a high clearing point are used in particular.

In general, the compositions consist of a plurality of compounds mixed in a conventional manner. In general, the desired amount of the components used in the smaller amount are dissolved in the components making up the principal constituent, advantageously at elevated temperature. If the temperature selected is above the clearing point of the principal constituent, completion of the dissolution process is particularly easy to observe.

However, it is also possible to mix the components in a suitable solvent, for example in acetone, chloroform or methanol, and, after mixing, to remove the solvent again, for example by distillation under reduced pressure. It goes without saying that it must be ensured here that the solvent does not introduce any impurities or undesired doping substances.

By means of suitable additives, the liquid-crystal phases according to the invention can be modified in such a way that they can be used in any type of PAD which has been disclosed hitherto.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application No. 197 33 199.8, filed Aug. 1, 1997 is hereby incorporated by reference.

In order to characterize the liquid-crystalline compounds used in the compositions according to the invention, the following abbreviations are used in the examples. The indices n and m denote the number of carbon atoms present in the terminal alkyl radicals.

The physical properties are the values at 20° C., unless explicitly stated otherwise.

In the present application and in the examples below, the structures of the liquid-crystal compounds are indicated by means of acronyms, the transformation into chemical formulae taking place in accordance with Table A and Table B below. All radicals $C_nH_{2n+1}$ and $C_mH_{2m+1}$ are straight-chain alkyl radicals having n or m carbon atoms respectively. The coding in Table B is self-evident. In Table A, only the acronym for the parent structure is given. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |

-continued

| Code for $R^1$, $R^2$, $L^1$, $L^2$ | $R^1$ | $R^2$ | $L^1$ | $L^2$ |
|---|---|---|---|---|
| nCl | $C_nH_{2n+1}$ | Cl | H | H |
| nF.F | $C_nH_{2n+1}$ | F | H | F |
| nmF | $C_nH_{2n+1}$ | $C_mH_{2m+1}$ | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | COOC$_m$H$_{2m+1}$ | H | H |
| nF.Cl | $C_nH_{2n+1}$ | Cl | H | F |

TABLE A

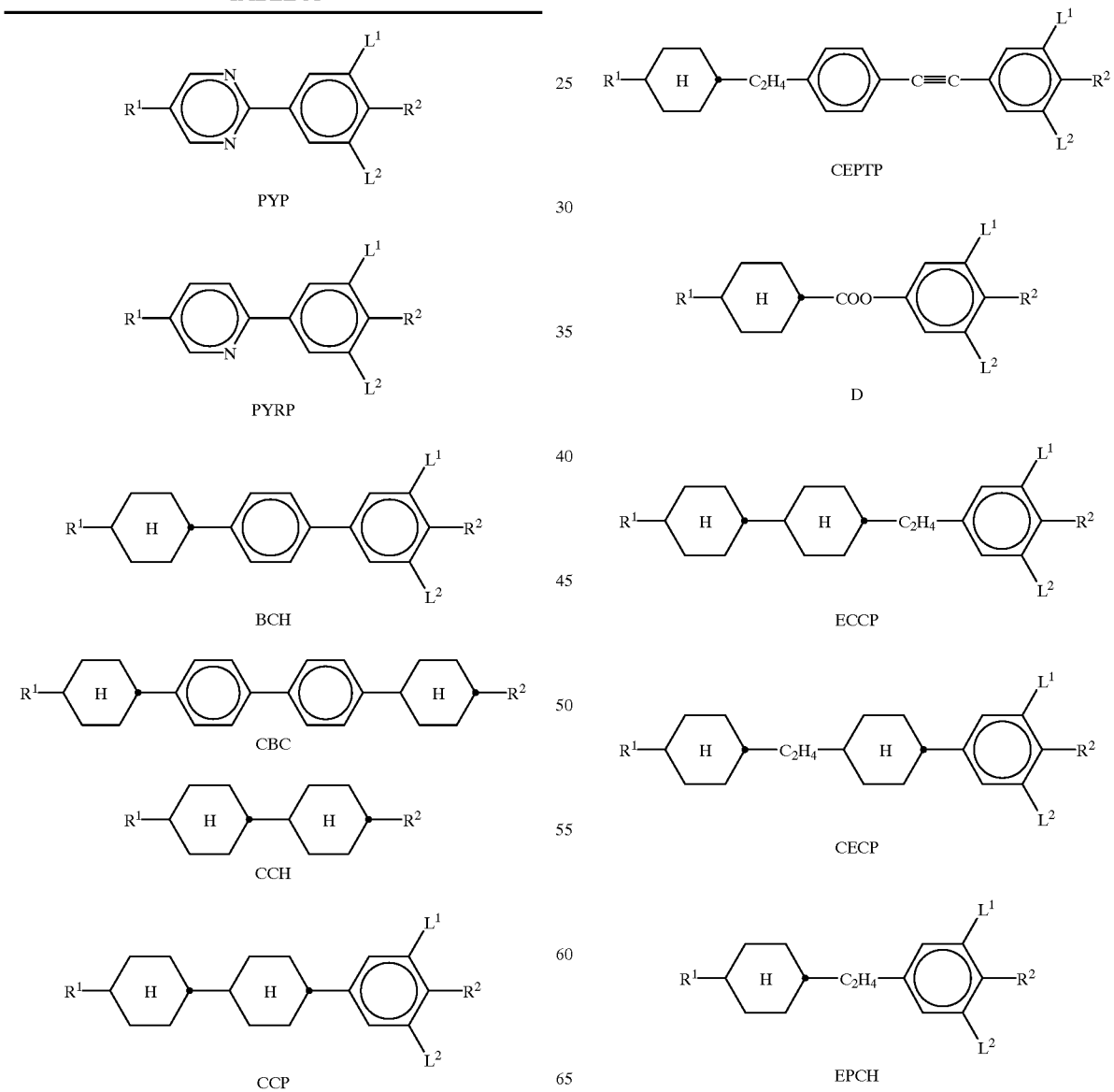

PYP

PYRP

BCH

CBC

CCH

CCP

CP

CPTP

CEPTP

D

ECCP

CECP

EPCH

TABLE A-continued
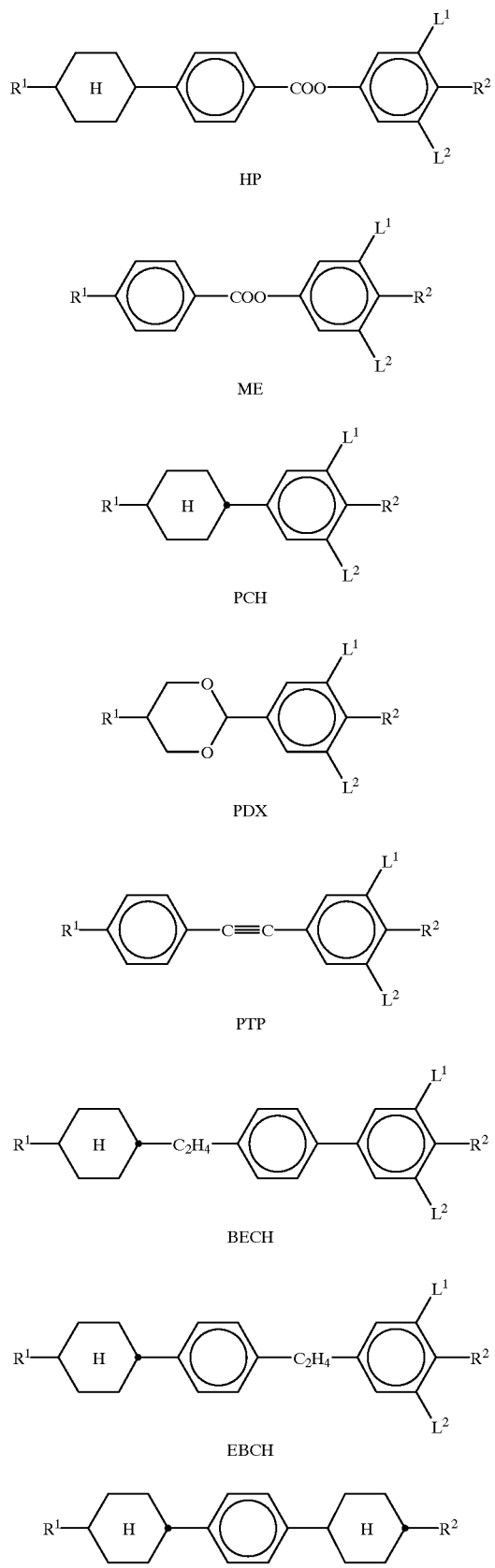
TABLE A-continued
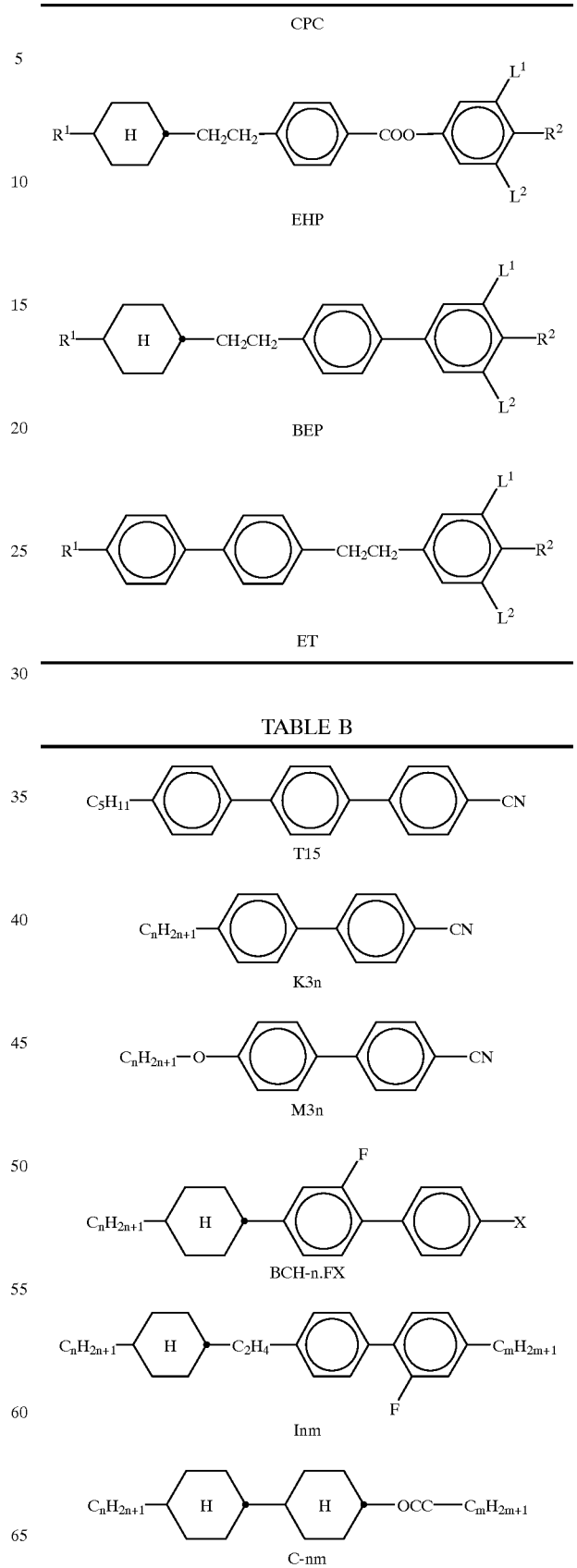

TABLE B-continued

C15: CH₃-branched ether biphenyl carbonitrile (C₂H₅-CH(CH₃)-CH₂-O-C₆H₄-C₆H₄-CN, chiral *)

CB15: CH₃-branched biphenyl carbonitrile (C₂H₅-CH(CH₃)-CH₂-C₆H₄-C₆H₄-CN, chiral *)

CBC-nmF: $C_nH_{2n+1}$–[H]–[phenyl(F)]–[phenyl]–[H]–$C_mH_{2m+1}$

CCN-nm: $C_nH_{2n+1}$–[H]–[H(CN)(C_mH_{2m+1})]

G3n: $C_nH_{2n+1}$–[H]–CH₂CH₂–[phenyl]–CN

CCEPC-nm: $C_nH_{2n+1}$–[H]–[H]–CH₂CH₂–[phenyl]–[H]–$C_mH_{2m+1}$

CCPC-nm: $C_nH_{2n+1}$–[H]–[H]–COO–[phenyl]–[H]–$C_mH_{2m+1}$

CH-nm: $C_nH_{2n+1}$–[H]–[H]–COO–[H]–$C_mH_{2m+1}$

HD-nm: $C_nH_{2n+1}$–[H]–[phenyl]–OOC–[H]–$C_mH_{2m+1}$

HH-nm: $C_nH_{2n+1}$–[H]–[phenyl]–COO–[H]–$C_mH_{2m+1}$

NCB-nm: $C_nH_{2n+1}$–[phenyl]–[phenyl]–[H(CN)(C_mH_{2m+1})]

OS-nm: $C_nH_{2n+1}$–[H]–COO–[H]–$C_mH_{2m+1}$

CHE: $C_2H_5$–[H]–COO–[phenyl]–[phenyl]–CN

ECBC-nm: $C_nH_{2n+1}$–[H]–C₂H₄–[phenyl]–[phenyl]–[H]–$C_mH_{2m+1}$

ECCH-nm: $C_nH_{2n+1}$–[H]–C₂H₄–[H]–[H]–$C_mH_{2m+1}$

CCH-n1EM: $C_nH_{2n+1}$–[H]–[H]–CH₂O–$C_mH_{2m+1}$

T-nFN: $C_nH_{2n+1}$–[phenyl]–[phenyl(F)]–[phenyl]–CN

B-nO.FN: $C_nH_{2n+1}$O–[phenyl]–[phenyl(F)]–CN

CVCC-n-m: $C_nH_{2n+1}$–[H]–CH=CH–[H]–[H]–$C_mH_{2m+1}$

CVCP-n-m: $C_nH_{2n+1}$–[H]–CH=CH–[H]–[phenyl]–$C_mH_{2m+1}$

CVCVC-n-m: $C_nH_{2n+1}$–[H]–CH=CH–[H]–CH=CH–[H]–$C_mH_{2m+1}$

CP-V-N: H₂C=CH–[H]–[phenyl]–CN

CC-n-V: $C_nH_{2n+1}$–[H]–[H]–CH=CH₂

TABLE B-continued

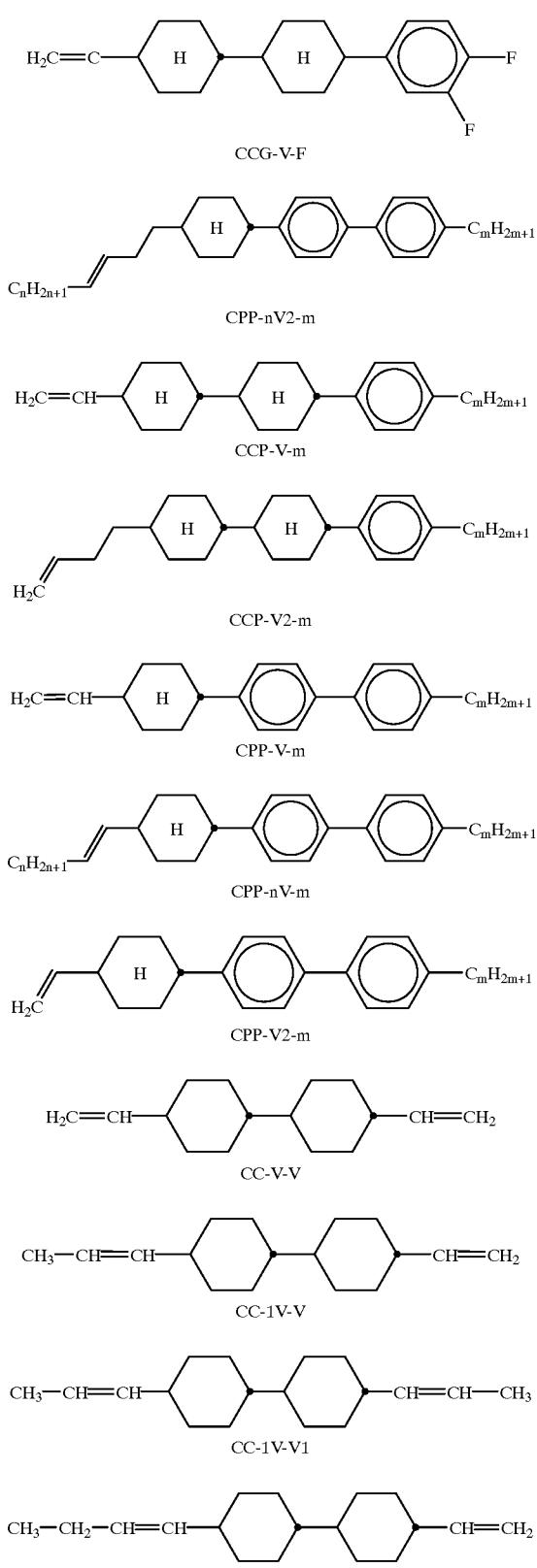

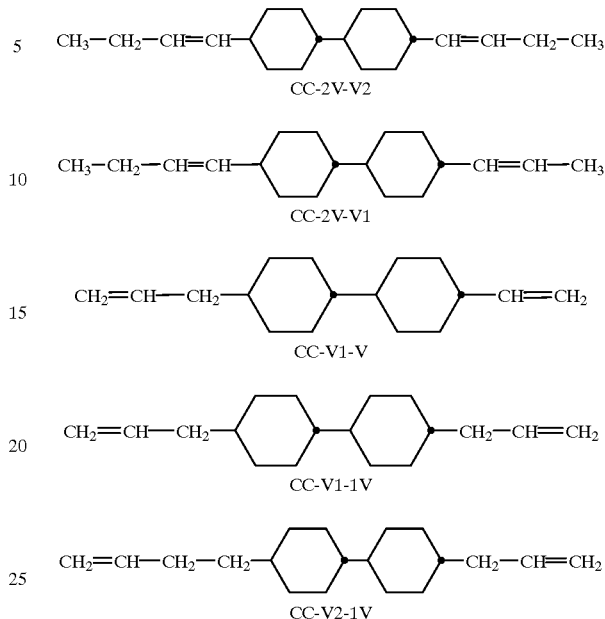

Δn denotes the optical anisotropy (589 nm, 20° C.), Δε denotes the dielectric anisotropy (1 kHz, 20° C.), H.R. denotes the voltage holding ratio (at 100° C., after 5 minutes in the oven, 1 V), $V_{0,0,20}$ denotes the threshold voltage determined at 20° C.

EXAMPLE 1

A mixture of the following composition was prepared and investigated for usefulness in PALCDs.

| Abbreviation | % by weight |
|---|---|
| CC—V—V | 14.0 |
| CC—2V—V2 | 10.0 |
| ECCP—3F.F | 5.0 |
| ECCP—5F.F | 5.0 |
| CCP—2F.F.F | 6.0 |
| CCP—3F.F.F | 6.0 |
| CCP—5F.F.F | 6.0 |
| CCH-303 | 13.0 |
| CCH-501 | 13.0 |
| CP-33 | 5.0 |
| CP-43 | 5.0 |
| CCPC-33 | 6.0 |
| CCPC-34 | 6.0 |
| | 100.0 |

This composition has the following properties:

| | |
|---|---|
| T (S, N) | <−20° C. |
| T (N, I) | 97.0° C. |
| Rot. visc. $\gamma_1$ (20° C.) | 99 mPa · s |
| Δn (20° C., 589 nm) | 0.0672 |
| Δε (20° C., 1 kHz) | 1.9 |
| $\epsilon_{\parallel}$ (20° C., 1 kHz) | 5.0 |
| $K_1$ (20° C.) | 13.2  $10^{-12}$ N |

-continued

| | |
|---|---|
| $K_3/K_1$ (20° C.) | 1.04 |
| $V_{0,0,20}$ | 2.82 V |
| HR (100° C., 5 min, 1 V) | 99.6% |

The threshold voltage $V_{0,0,20}$ was determined at 20° C. (from dielectric measurements).

The voltage holding ratio (HR) was determined using an Autronic-Melchers measurement instrument as described in the Merck Group Liquid Crystal Newsletter No. 9, October 1992, by T. Jacob and U. Finkenzeller.

COMPARATIVE EXAMPLE 1

The liquid-crystal mixture having a similar clearing point was prepared analogously to Example 1, but without using any compounds of the formula I.

Composition

| Abbreviation | % by weight |
|---|---|
| PCH-301 | 7.0 |
| PCH-302 | 3.0 |
| ECCP—3F.F | 5.0 |
| ECCP—5 F.F | 5.0 |
| CCP—2F.F.F | 6.0 |
| CCP—3F.F.F | 6.0 |
| CCP—5F.F.F | 6.0 |
| CCH-301 | 14.0 |
| CCH-303 | 13.0 |
| CCH-501 | 13.0 |
| CP-33 | 5.0 |
| CP-43 | 5.0 |
| CCPC-33 | 4.0 |
| CCPC-34 | 4.0 |
| CCPC-35 | 4.0 |
| | 100.0 |

Properties

| | |
|---|---|
| T (S, N) | <−20° C. |
| T (N, I) | 93° C. |
| Rot. visc. $\gamma_1$ (20° C.) | 122 mPa · s |
| Δn (20° C., 589 nm) | 0.0668 |
| Δε (20° C., 1 kHz) | 1.9 |
| $\varepsilon_{II}$ (20° C., 1 kHz) | 5.2 |
| $K_1$ (20° C.) | $14.7 \cdot 10^{-12}$ N |
| $K_3/K_1$ (20° C.) | 1.12 |
| $V_{0,0,20}$ | 2.93 V |
| HR (100° C., 1 V) | 97.1% |

Compared with Comparative Example 1, Example 1 according to the invention, with a higher clearing points, is characterized by a significantly better threshold voltage and in particular by a considerably better rotational viscosity. The mixture according to the invention thus switches significantly more quickly. In addition, its HR is significantly higher, i.e. better for plasma addressing.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A plasma-addressed liquid crystalline display, containing a nematic liquid-crystal composition comprising at least one compound of the formula I

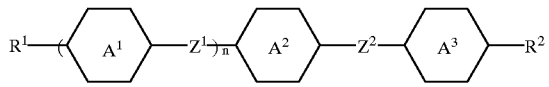

in which $R^1$ and $R^2$, are each independently alkenyl or alkenyloxy having 1 to 8 carbon atoms, each $Z^1$ and $Z^2$, is independently a single bond, —(CH$_2$)$_2$— —COO—, —OCO—, trans—CH=CH—, —CH$_2$O— or —OCH$_2$—, each $A^1$, $A^2$ and $A^3$, is independently trans-1,4-cyclohexylene, 1,4-cyclohexenylene, in which also one or two nonadjacent CH$_2$ groups may be replaced by oxygen, 1,4-phenylene, 2-fluoro-1,4-phenylene, 3-fluoro-1,4-phenylene, 2,3-difluoro-1,4-phenylene, 3,5-difluoro-1,4-phenylene, 2,6-difluoro-1,4-phenylene, 1,5-pyridyl or 1,5-pyrimidyl, in which one or two H atoms are optionally replaced by F, and n is 0, 1 or 2.

2. A display according to claim 1, wherein the nematic liquid-crystal composition further comprises at least one compound of the formula II

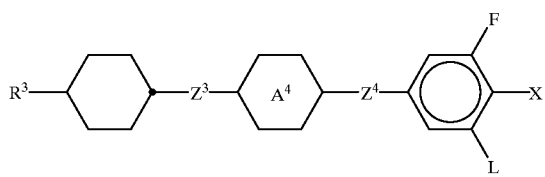

in which $R^3$ is alkyl, alkenyl, alkyloxy or alkenyloxy having 1–8 carbon atoms, $Z^3$ and $Z^4$ are each independently a single bond, (CH$_2$)$_2$, OCH$_2$, CH$_2$O, or COO, X is OCF$_2$H, OCF$_3$, OCH$_2$CF$_3$, OCHFCF$_3$, OCF$_2$CF$_2$H or F L is H or F and $A^4$ is trans-1,4-cyclohexylene, 1,4-phenylene, 3-fluoro-1,4-phenylene or 3,5-difluoro-1,4-phenylene.

3. A display according to claim 1, wherein the nematic liquid-crystal composition further comprises at least one compound of the formula Ia

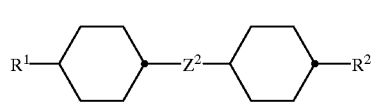

in which $R^1$ and $R^2$, are each independently alkenyl or alkenyloxy having 1 to 8 carbon atoms, and $Z^2$ is a single bond, —(CH$_2$)$_2$— or trans—CH=CH—.

4. A display according to claim 1, wherein the nematic liquid-crystal composition further comprises at least one compound of the formula III

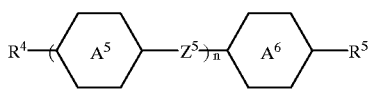

III in which
R$^4$ and R$^5$, are each independently alkyl, alkoxy, alkenyl or alkenyloxy having 1 to 10 carbon atoms, in which 1 or a maximum of 2 non-adjacent CH$_2$ groups may be replaced by O,
each Z$^5$ is independently a single bond, COO, OCO, (CH$_2$)$_2$, OCH$_2$, CH$_2$O or trans—CH=CH,
each A$^5$ and A$^6$ is independently trans-1,4-cyclohexylene, 1,4-cyclohexenylene, in which also one or two nonadjacent CH$_2$ groups may be replaced by oxygen, 1,4-phenylene, 2-fluoro-1,4-phenylene, 3-fluoro-1,4-phenylene, 2,3-difluoro-1,4-phenylene, 3,5-difluoro-1,4-phenylene, 2,6-difluoro-1,4-phenylene or 1,5-pyrimidinediyl, in which one or two H atoms are optionally replaced by F, and
n is 1, 2 or 3.

5. A display according to claim 1, wherein the nematic liquid-crystal composition comprises at least one compound of the formula Iaa

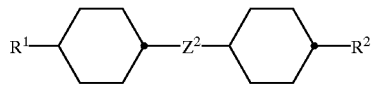

Iaa in which
R$^1$ and R$^2$, are each independently CH=CH$_2$, CH=CH—CH$_2$—CH$_3$ and/or CH=CH—CH$_3$ and
Z$^2$ is —(CH$_2$)$_2$— or a single bond.

6. A display according to claim 3, wherein the nematic liquid-crystal composition comprises at least one compound of the formula I'

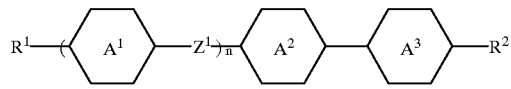

I'

7. A display according to claim 5, wherein the nematic liquid-crystal composition further comprises at least one compound of the formula II

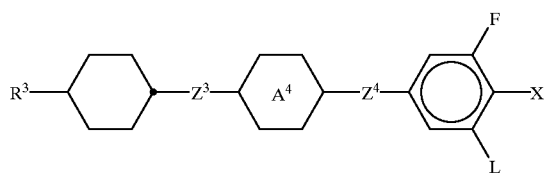

II in which
R$^3$ is alkyl, alkenyl, alkyloxy or alkenyloxy having 1–8 carbon atoms, Z$^3$ and Z$^4$ are each independently a single bond, (CH$_2$)$_2$, OCH$_2$, CH2O, or COO,
x is OCF$_2$H, OCF$_3$, OCH$_2$CF$_3$, OCHFCF$_3$, OCF$_2$CF$_H$ or $F$
L is H or F and
A$^4$ is trans-1,4-cyclohexylene, 1,4-phenylene, 3-fluoro-1,4-phenylene or 3,5-difluoro-1,4-phenylene.

8. A display according to claim 15, wherein the nematic liquid crystal composition comprises at least two compounds of formula Iaa.

9. A display according to claim 5, wherein the nematic liquid crystal composition least two compounds of formulae Ia1 to Ia9

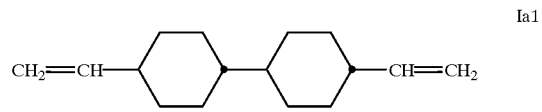

Ia1

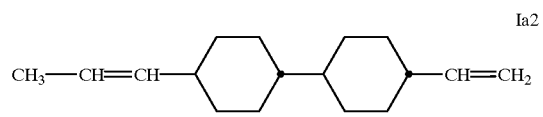

Ia2

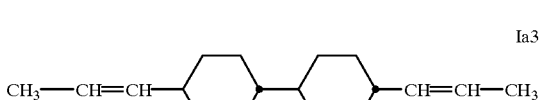

Ia3

Ia4

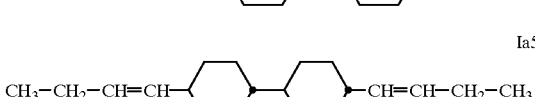

Ia5

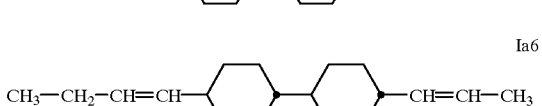

Ia6

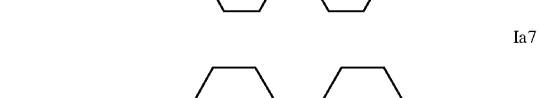

Ia7

Ia8

Ia9

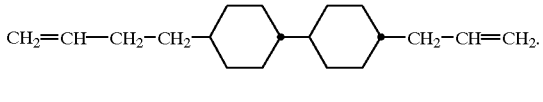

10. A display according to claim 1, wherein the liquid crystal composition has a dielectric anisotropy, measured at 20° C. and 1 kHz, of less than 4.0.

11. A display according to claim 1, wherein the liquid crystal composition has a dielectric anisotropy, measured at 20° C. and 1 kHz, of 1.0 to 3.0.

12. A display according to claim 1, wherein the liquid crystal composition has a dielectric anisotropy, measured at 20° C. and 1 kHz, of 1.5 to 2.5.

13. A display according to claim 4, wherein the liquid crystal composition comprises two or more compounds of formula III.

14. A display according to claim 4, wherein the compound of formula III is of formula IIIa or formula IIIb
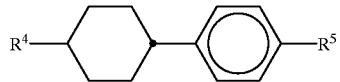
IIIa
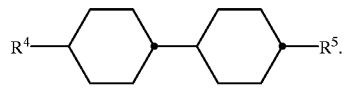
IIIb
* * * * *

UNITED STATES PATENT AND TRADEMARK OFFICE
CERTIFICATE OF CORRECTION

| | | |
|---|---|---|
| PATENT NO. | : 6,174,572 B1 | Page 1 of 1 |
| APPLICATION NO. | : 09/126955 | |
| DATED | : January 16, 2001 | |
| INVENTOR(S) | : Harald Hirschmann | |

It is certified that error appears in the above-identified patent and that said Letters Patent is hereby corrected as shown below:

On Title page, Front Application Priority should read -- Aug. 1, 1997 (DE).....................197 33 199.8 --
Column 18, line 2 reads "CH2O" should read -- $CH_2 0$ --
Column 18, line 3 reads "$OCF_2CF_{H\,or\,F}$" should read -- $OCF_2CF_2H$ or F --
Column 18, line 8 reads "A display according to claim 15" should read-- A display according to claim 5 --
Column 18, line 12 reads "liquid crystal composition least two compounds of formulae" should read -- liquid crystal composition comprises at least two compounds of formulae --

Signed and Sealed this

Seventeenth Day of April, 2007

JON W. DUDAS
*Director of the United States Patent and Trademark Office*